(12) United States Patent
Xie et al.

(10) Patent No.: US 9,557,949 B2
(45) Date of Patent: Jan. 31, 2017

(54) PRINT SCHEDULING AND PROCESSING METHOD, APPARATUS AND SYSTEM

(71) Applicants: PEKING UNIVERSITY FOUNDER GROUP CO., LTD., Beijing (CN); BEIJING FOUNDER ELECTRONICS CO., LTD., Beijing (CN)

(72) Inventors: Hao Xie, Beijing (CN); Jian Wang, Beijing (CN)

(73) Assignees: BEIJING FOUNDER ELECTRONICS CO., LTD., Beijing (CN); PEKING UNIVERSITY FOUNDER GROUP CO., LTD., Beijing (CN)

( * ) Notice: Subject to any disclaimer, the term of this patent is extended or adjusted under 35 U.S.C. 154(b) by 63 days.

(21) Appl. No.: 14/096,710

(22) Filed: Dec. 4, 2013

(65) Prior Publication Data

US 2014/0307287 A1    Oct. 16, 2014

(30) Foreign Application Priority Data

Apr. 16, 2013    (CN) .......................... 2013 1 0131659

(51) Int. Cl.
```
G06F 3/12      (2006.01)
G06K 15/00     (2006.01)
H04N 1/40      (2006.01)
H04N 1/23      (2006.01)
```
(52) U.S. Cl.
CPC ............ *G06F 3/1288* (2013.01); *G06F 3/126* (2013.01); *G06F 3/1211* (2013.01); *G06F 3/1226* (2013.01); *G06F 3/1217* (2013.01)

(58) Field of Classification Search
CPC ... H04N 1/047; H04N 1/00236; G06F 3/1262; G06F 3/1275; G06F 3/1215
USPC ...... 358/1.9, 518, 1.17, 1.15, 1.16; 709/223, 709/212, 221, 201; 710/16
See application file for complete search history.

(56) References Cited

U.S. PATENT DOCUMENTS

| | | | | |
|---|---|---|---|---|
| 6,724,422 B1 * | 4/2004 | Werner | .................. | H04N 1/603 348/187 |
| 6,840,597 B1 * | 1/2005 | Wilson | .................. | B41J 29/393 347/19 |
| 8,364,805 B2 * | 1/2013 | Mandell | .............. | H04L 41/0213 709/212 |
| 2002/0033964 A1 * | 3/2002 | Suzuki | .................. | H04N 1/233 358/1.15 |
| 2002/0089689 A1 * | 7/2002 | Ferlitsch | ............... | G06F 3/1203 358/1.15 |
| 2003/0098993 A1 * | 5/2003 | Ohara | .................... | G06F 3/1205 358/1.15 |
| 2004/0008366 A1 * | 1/2004 | Ferlitsch | ................ | G06K 15/00 358/1.15 |

(Continued)

*Primary Examiner* — Akwasi M Sarpong
(74) *Attorney, Agent, or Firm* — Workman Nydegger

(57) ABSTRACT

A print scheduling and processing method, apparatus and system are disclosed. Embodiments of the invention adopt such a method that at least one print processing apparatus satisfying a print requirement of a user is determined; upon reception of a print request sent from an idle print processing apparatus, the idle print processing apparatus sending the print request is notified of a print task of the user if it is determined that the idle print processing apparatus is included among the at least one print processing apparatus satisfying the print requirement of the user.

7 Claims, 6 Drawing Sheets

(56) References Cited

U.S. PATENT DOCUMENTS

| | | | | |
|---|---|---|---|---|
| 2004/0061890 | A1* | 4/2004 | Ferlitsch | G06F 3/1205 |
| | | | | 358/1.15 |
| 2004/0190042 | A1* | 9/2004 | Ferlitsch | H04N 1/00233 |
| | | | | 358/1.15 |
| 2005/0068557 | A1* | 3/2005 | Patton | H04N 1/00477 |
| | | | | 358/1.13 |
| 2005/0099649 | A1* | 5/2005 | Ferlitsch | H04N 1/00278 |
| | | | | 358/1.15 |
| 2005/0243365 | A1* | 11/2005 | Noda | G06F 3/1262 |
| | | | | 358/1.15 |
| 2013/0085968 | A1* | 4/2013 | Schultz | G06F 21/32 |
| | | | | 705/400 |

* cited by examiner

| Virtual print parameter template ID |
| --- |
| Characteristic parameter name 1 |
| Characteristic parameter value 1 |
| Characteristic parameter name 2 |
| Characteristic parameter value 2 |
| ... ... |
| Characteristic parameter name n |
| Characteristic parameter value n |

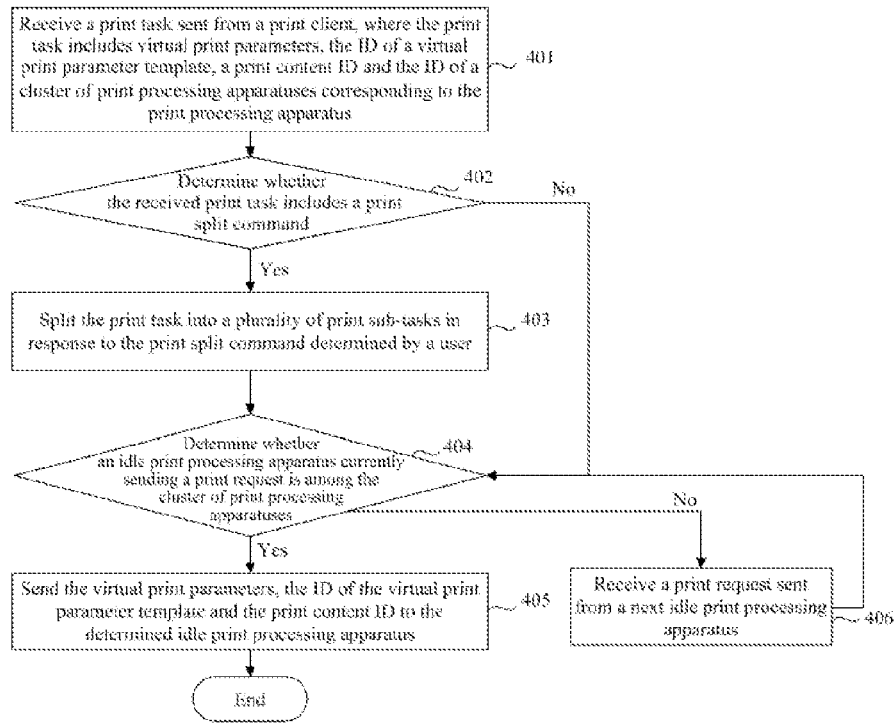
Fig.4
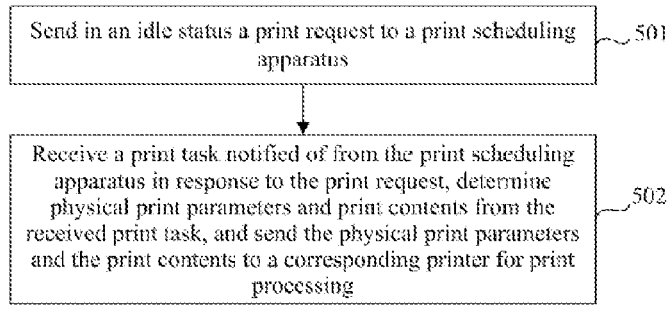
Fig.5
Fig.6

PRINT SCHEDULING AND PROCESSING METHOD, APPARATUS AND SYSTEM

CROSS-REFERENCE TO RELATED APPLICATIONS

The present application claims priority to Chinese Patent Application No. 201310131659.6 filed with the Chinese Patent Office on Apr. 16, 2013 and entitled "print scheduling and processing method, apparatus and system", which is hereby incorporated by reference in its entirety.

FIELD OF THE INVENTION

The present invention relates to the field of a pre-print operating flow in a print technology and particularly to a print scheduling and processing method, apparatus and system.

BACKGROUND OF THE INVENTION

A print system includes a print client, a print server, a printer and other components, where the print server includes a print scheduling apparatus and print processing apparatuses. A print flow in the print system is as follows:

The print client selects a print processing apparatus, determines print parameters, generates a print request from the print parameters and sends the determined print request to the print server. The print server receives the print request sent from the print client and the ID of the print processing apparatus selected by the print client and sends the print request to the print processing apparatus determined by the print client. Upon reception of the print request, the print processing apparatus generates a printer print token from the print parameters carried in the print request and drives a printer to perform a print operation in response to the print token.

In order to improve the throughput of the print system, the print system is typically configured with a plurality of print processing apparatuses. The print client requesting for a print operation needs to select a print processing apparatus to perform the print operation. If the print client selects a print processing apparatus in operation, then it has to be queued and wait, and even if there is a print processing apparatus idle in the print system, the print client has no alternative to being queued at the selected print processing apparatus and waiting.

In summary, in the print system composed of a plurality of print processing apparatuses, the print client can only select a print processing apparatus for print processing, and when the selected print processing apparatus is in operation, then it has to be queued and wait, thus degrading the efficiency of the print system in use and lowering the print throughput of the print system as a whole.

SUMMARY OF THE INVENTION

Embodiments of the invention provide a print method, apparatus and system so as to address the problem in a print system composed of a plurality of print processing apparatuses that when a print client selects a print processing apparatus in operation, it has to be queued and wait, thus degrading the efficiency of the print system in use and lowering the print throughput of the print system as a whole.

An embodiment of the invention provides a print scheduling method including:

determining at least one print processing apparatus satisfying a print requirement of a user; and upon reception of a print request sent from an idle print processing apparatus, notifying the idle print processing apparatus sending the print request of a print task of the user if it is determined that the idle print processing apparatus sending the print request is included among the at least one print processing apparatus satisfying the print requirement of the user.

An embodiment of the invention provides a print processing method including:

sending in an idle status a print request to a print scheduling apparatus; and receiving a print task notified of from the print scheduling apparatus in response to the print request, determining physical print parameters and print contents from the received print task, and sending the physical print parameters and the print contents to a corresponding printer for print processing.

An embodiment of the invention provides a print scheduling apparatus including:

a print processing apparatus filtering module configured to determine at least one print processing apparatus satisfying a print requirement of a user; and a print processing apparatus determining module configured, upon reception of a print request sent from an idle print processing apparatus, to notify the idle print processing apparatus sending the print request of a print task of the user if it is determined that the idle print processing apparatus sending the print request is included among the at least one print processing apparatus satisfying the print requirement of the user.

An embodiment of the invention provides a print processing apparatus including:

a print request sending module configured to send in an idle status a print request to a print scheduling apparatus; and a print request processing module configured to receive a print task notified of from the print scheduling apparatus in response to the print request, to determine physical print parameters and print contents from the received print task, and to send the physical print parameters and the print contents to a corresponding printer for print processing.

An embodiment of the invention provides a print system including:

a print scheduling apparatus configured to determine at least one print processing apparatus satisfying a print requirement of a user; and upon reception of a print request sent from an idle print processing apparatus, to notify the idle print processing apparatus sending the print request of a print task of the user if it is determined that the idle print processing apparatus sending the print request is included among the at least one print processing apparatus satisfying the print requirement of the user; and the print processing apparatus configured to send in an idle status the print request to the print scheduling apparatus; and to receive the print task notified of from the print scheduling apparatus in response to the print request, to determine physical print parameters and print contents from the received print task, and to send the physical print parameters and the print contents to a corresponding printer for print processing.

The embodiments of the invention adopt such a method that at least one print processing apparatus satisfying a print requirement of a user is determined; upon reception of a print request sent from an idle print processing apparatus, the idle print processing apparatus sending the print request is notified of a print task of the user if it is determined that the idle print processing apparatus sending the print request is included among the at least one print processing apparatus satisfying the print requirement of the user. The print scheduling apparatus determines at least one print processing apparatus corresponding to the print requirement of the user upon reception of the print requirement, and when the determined and idle print processing apparatus sends the print request to the print scheduling apparatus, the print scheduling apparatus notifies the corresponding idle print processing apparatus satisfying the print requirement of the print task for print processing, thus avoiding the problem in the prior art that a print processing apparatus in operation is assigned with a print task but cannot process the print task in a timely manner and has it queued and waiting although there is another idle print processing apparatus at that time and consequently wasting resources of the print system, and instead enhancing the efficiency of the print system in use and improving the print throughout of the print system as a whole.

BRIEF DESCRIPTION OF THE DRAWINGS

FIG. 4 is a schematic flow chart of a print scheduling method in which a print processing apparatus is determined by a cluster of print processing apparatuses in an embodiment of the invention;

FIG. 5 is a schematic flow chart of a print processing method in an embodiment of the invention;

FIG. 6 is a schematic structural diagram of a physical print parameter template in an embodiment of the invention;

DETAILED DESCRIPTION OF THE EMBODIMENTS

Embodiments of the invention adopt such a method that a print scheduling apparatus determines at least one print processing apparatus satisfying a print requirement of a user; upon reception of a print request sent from an idle print processing apparatus in a poll manner, the print scheduling apparatus notifies the idle print processing apparatus sending the print request if it is determined that the idle print processing apparatus is included among the at least one print processing apparatus satisfying the print requirement of the user; and the print processing apparatus determines physical print parameters and print contents from the received notification and sends the physical print parameters and the print contents to a corresponding printer for print processing, thus avoiding the problem in the prior art that a print processing apparatus in operation is assigned with a print task but can not process the print task in a timely manner and has it queued and waiting although there is another idle print processing apparatus at that time and consequently wasting resources of a print system, and instead enhancing the efficiency of the print system in use and improving the print throughout of the print system as a whole.

The embodiments of the invention will be further described below in details with reference to the drawings.

Figures 1, 2:
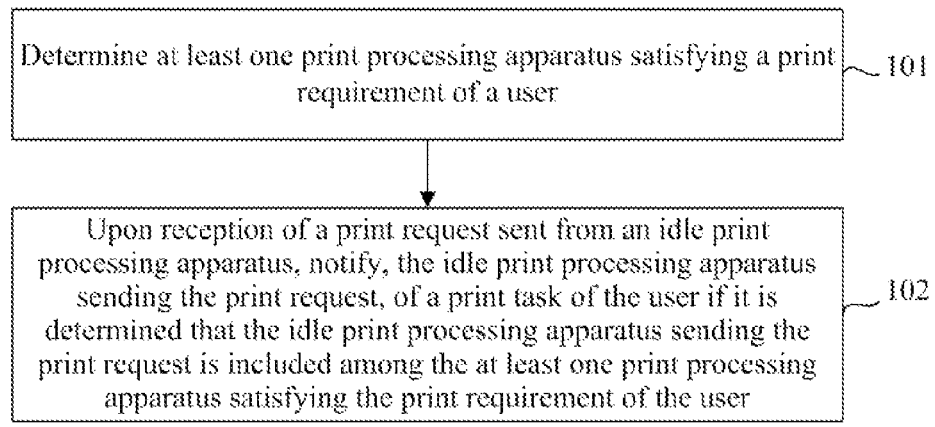
FIG. 1 is a schematic flow chart of a print scheduling method in an embodiment of the invention.
FIG. 2 is a schematic structural diagram of a virtual print parameter template in an embodiment of the invention.

As illustrated in FIG. 1 showing a print scheduling method in an embodiment of the invention, the method includes the following steps:

Step 101: At least one print processing apparatus satisfying a print requirement of a user is determined.

Step 102: Upon reception of a print request sent from an idle print processing apparatus, the idle print processing apparatus sending the print request is notified of a print task of the user if it is determined that the idle print processing apparatus sending the print request is included among the at least one print processing apparatus satisfying the print requirement of the user.

In the step 101, the at least one print processing apparatus satisfying the print requirement of the user is determined by a print scheduling apparatus determining a virtual print parameter template selected by the user through a print client and taking a print processing apparatus corresponding to the determined virtual print parameter template as a print processing apparatus satisfying print parameters selected by the user.

Particularly each virtual print parameter template includes virtual print parameters representing print characteristics, each virtual print parameter template corresponds to at least one print processing apparatus, and the virtual print parameters in each virtual print parameter template represent print characteristics common to printers corresponding to all the print processing apparatuses corresponding to the virtual print parameter template.

Particularly the print scheduling apparatus determines the print processing apparatus corresponding to the virtual print parameter template in two approaches which will be described below respectively.

In a first approach, the print scheduling apparatus determines the print processing apparatus by the ID of the virtual print parameter template.

The print scheduling apparatus stores therein a correspondence relationship between each virtual print parameter template and an ID of a corresponding print processing apparatus, and determines the ID of the print processing apparatus corresponding to the virtual print parameter template upon reception of the ID of the virtual print parameter template corresponding to the virtual print parameter template selected by the user through the print client; and upon reception of a print request sent from an idle print processing apparatus, the print scheduling apparatus determines whether the ID of the idle print processing apparatus belongs to the print processing apparatus corresponding to the currently received virtual print parameter template, and if the ID belongs to the print processing apparatus corresponding to the virtual print parameter template, then the print scheduling apparatus sends the virtual print parameters, the ID of the virtual print parameter template and a print content ID to the idle print processing apparatus; otherwise, the print scheduling apparatus continues with receiving a print request sent from a next idle print processing apparatus and returns to the step of determining whether the idle print processing apparatus currently sending the print request to the print scheduling apparatus is among the print scheduling apparatuses corresponding to the virtual print parameter template.

For example, there are four print processing apparatuses in total in a print system, where the first print processing apparatus, the second print processing apparatus and the third print processing apparatus each are provided with three print characteristics of A4-sized print, double-sided print and high-resolution print, and the second print processing apparatus and the fourth print processing apparatus each are provided with two print characteristics of B5-sized print and split print. A print parameter configuration facility generates a first virtual print parameter template from the three common print characteristics of the first print processing apparatus, the second print processing apparatus and the third print processing apparatus and generates a second virtual print parameter template from the two common print characteristics of the second print processing apparatus and the fourth print processing apparatus.

When the print client needs to have the contents A4-sized and double-sided printed, the print client determines virtual print parameters on the first virtual print parameter template in response to the print requirement and sends the virtual print parameters, the ID of the first virtual print parameter template and a print content ID to the print scheduling apparatus.

The print scheduling apparatus determines from the received ID of the first virtual print parameter template that the virtual print parameter template used by the print client is the first virtual print parameter template and determines that the first virtual print parameter template corresponds to the first print processing apparatus, the second print processing apparatus and the third print processing apparatus. At this time the first print processing apparatus is in operation, and the other print processing apparatuses are idle; and the third print processing apparatus sends a print request to the print scheduling apparatus, and the print scheduling apparatus determines that the third print processing apparatus is among the print processing apparatuses corresponding to the first virtual print parameter template, and then sends the virtual print parameters, the ID of the first virtual print parameter template and the print content ID to the third print processing apparatus.

In a second approach, the print scheduling apparatus determines the print processing apparatus by the ID of a cluster of print processing apparatuses.

A print server further includes a print parameter configuration facility which attributes print processing apparatuses, to which a part or all of print characteristics are common, to a cluster of print processing apparatuses and stores the ID of each print processing apparatus in the cluster of print processing apparatuses. The print parameter configuration facility generates a virtual print parameter template corresponding to the cluster of print processing apparatuses from the print characteristics common to all the print processing apparatuses in the cluster of print processing apparatuses.

The print client selects a print processing apparatus and a virtual print parameter template corresponding to the print processing apparatus, and selects virtual print parameters on the virtual print parameter template, and the print client determines a cluster of print processing apparatuses corresponding to the print processing apparatus according to a correspondence relationship between the virtual print parameter template and the cluster of print processing apparatuses; and the print client sends the virtual print parameters, the ID of the virtual print parameter template, a print content ID, and the ID of the cluster of print processing apparatuses corresponding to the print processing apparatus to the print scheduling apparatus.

The print scheduling apparatus determines the ID of the cluster of print processing apparatuses selected by the user through the print client and determines the print processing apparatuses corresponding to the determined cluster of print processing apparatuses as print processing apparatuses satisfying the print parameters selected by the user.

Particularly each cluster of print processing apparatuses stores therein the ID of each print processing apparatus in the cluster of print processing apparatuses, and each cluster of print processing apparatuses corresponds to at least one print processing apparatus.

The print scheduling apparatus determines from the ID of the cluster of print processing apparatuses the print processing apparatuses corresponding to the cluster of print processing apparatuses; and upon reception of a print request sent from an idle print processing apparatus, the print scheduling apparatus determines whether the idle print processing apparatus is among the determined cluster of print processing apparatuses, and if it is among the cluster of print processing apparatuses, then the print scheduling apparatus sends the virtual print parameters, the ID of the virtual print parameter template, the print content ID to the idle print processing apparatus; otherwise, the print scheduling apparatus continues with receiving a print request sent from a next idle print processing apparatus and returns to the step of determining whether the idle print processing apparatus currently sending the print request to the print scheduling apparatus is among the cluster of print scheduling apparatuses corresponding to the virtual print parameter template.

For example, there are five print processing apparatuses in total in a print system, where the first print processing apparatus, the second print processing apparatus and the third print processing apparatus each are provided three print characteristics of A4-sized print, double-sided print and high-resolution print, and the fourth print processing apparatus and the fifth print processing apparatus each are provided with two print characteristics of B5-sized print and split print. A print parameter configuration facility attributes the first print processing apparatus, the second print processing apparatus and the third print processing apparatus to a cluster of print processing apparatuses denoted as a first cluster of print processing apparatuses, and generates a first virtual print parameter template from the three common print characteristics of the first cluster of print processing apparatuses and creates a correspondence relationship between the first cluster of print processing apparatuses and the first virtual print parameter template. The print parameter configuration facility attributes the fourth print processing apparatus and the fifth print processing apparatus to a cluster of print processing apparatuses denoted as a second cluster of print processing apparatuses, and generates a second virtual print parameter template from the two common print characteristics of the second cluster of print processing apparatuses and creates a correspondence relationship between the second cluster of print processing apparatuses and the second virtual print parameter template.

When contents need to be A4-sized and double-sided printed, the print client determines virtual print parameters on the first virtual print parameter template in response to the print requirement, determines the first cluster of print processing apparatuses to be used for print processing according to the correspondence relationship between the first virtual print parameter template and the first cluster of print processing apparatuses, and sends the virtual print parameters, the ID of the first virtual print parameter template, the ID of the first cluster of print processing apparatuses and a print content ID to the print scheduling apparatus.

The print scheduling apparatus determines from the received ID of the first cluster of print processing apparatuses that the first cluster of print processing apparatuses corresponds to the first print processing apparatus, the second print processing apparatus and the third print processing apparatus. At this time the first print processing apparatus and the fourth print processing apparatus are in operation, and the other print processing apparatuses are idle; and the second print processing apparatus sends a print request to the print scheduling apparatus, and the print scheduling apparatus determines that the second print processing apparatus is among the cluster of print processing apparatuses corresponding to the first virtual print parameter template, and then sends the virtual print parameters, the ID of the first virtual print parameter template and the print content ID to the second print processing apparatus.

In the step 102, there may be several print tasks in the print scheduling apparatus, and when an idle print processing apparatus sends a print request to the print scheduling apparatus, the print scheduling apparatus determines whether the ID of a virtual print parameter template or the ID of a cluster of print processing apparatuses of a print task corresponds to the idle print processing apparatus, and if the ID corresponds to the ID of the idle print processing apparatus, then the print scheduling apparatus notifies the print processing apparatus of the ID of the virtual print parameter template and print contents corresponding to the task; otherwise, the print scheduling apparatus determines whether the idle print processing apparatus is among print processing apparatuses corresponding to the ID of a virtual print parameter template or the ID of a cluster of print processing apparatuses of another print task.

As illustrates in FIG. 2 showing a schematic structural diagram of a virtual print parameter template in an embodiment of the invention, the virtual print parameter template includes the ID of the virtual print parameter template and print characteristic parameters. Particularly the print characteristic parameters each include the name of the characteristic parameter and the value of the characteristic parameter corresponding to the name of the characteristic parameter. The ID of the virtual print parameter template is a unique ID of the virtual print parameter template. The print characteristic parameters describe print capabilities of the virtual print parameter template, where the names of the characteristic parameters each represent the name of a print operation of the virtual print parameter template, and the values of the characteristic parameters each represent specific operation contents corresponding to the name of the characteristic parameter. For example, the template ID of a virtual print parameter template is 0021, and the names of characteristic parameters of the virtual print parameter template include the size of paper, a paper feeding box and a resolution; and the values of the characteristic parameter corresponding to the size of paper include A4 and B5; the values of the characteristic parameter corresponding to the paper feeding box include a first paper feeding box, a second paper feeding box and a third paper feeding box; and the values of the characteristic parameter corresponding to the resolution include a high resolution, a medium resolution and a low resolution. The user determines the virtual print parameters as needed on the virtual print parameter template through the print client.

Preferably in the step 102, the print task is further split into a plurality of print sub-tasks if it is determined that the user needs to split the print task. Particularly the user can choose to split the print task into a number of pages or can choose to split the print task into a number of copies.

Upon reception of the print request sent from the idle print processing apparatus, the print scheduling apparatus sends, to the idle print processing apparatus sending the print request, the virtual print parameter template ID corresponding to the determined virtual print parameter template and a print sub-task which has not been sent to any print processing apparatus if it is determined that the idle print processing apparatus is among the at least one print processing apparatus satisfying the print requirement of the user.

Figure 3:
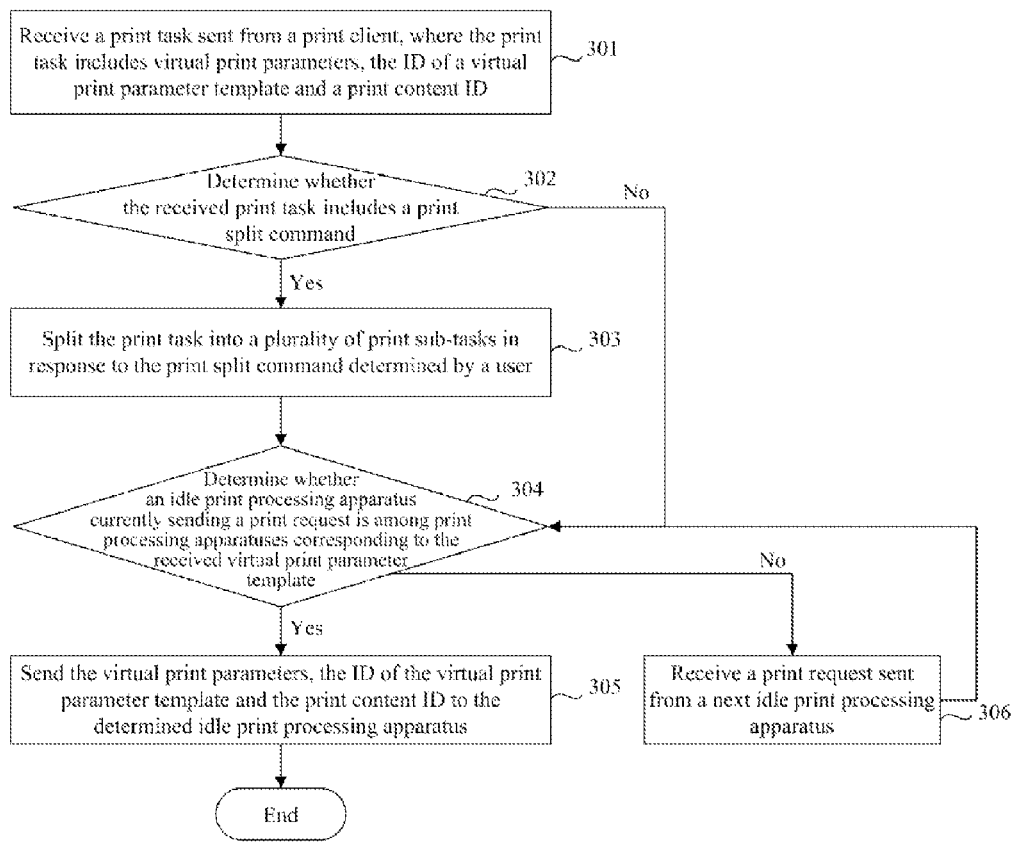
FIG. 3 is a schematic flow chart of a print scheduling method in which a print processing apparatus is determined by a virtual print parameter template in an embodiment of the invention.

As illustrated in FIG. 3 showing a print scheduling method of determining a print processing apparatus by a virtual print parameter template in an embodiment of the invention, the method includes the following steps.

Step 301: A print task sent from a print client is received, where the print task includes virtual print parameters, the ID of a virtual print parameter template and a print content ID.

Step 302: It is determined whether the received print task includes a print split command, and if it includes a print split command, then the flow proceeds to the step 303; otherwise, the flow proceeds to the step 304.

Step 303: The print task is split into a plurality of print sub-tasks in response to the print split command determined by a user, and then the flow proceeds to the step 304.

Step 304: It is determined whether an idle print processing apparatus currently sending a print request is among print processing apparatuses corresponding to the received virtual print parameter template, and if it is among the print processing apparatuses corresponding to the virtual print parameter template, then the flow proceeds to the step 305; otherwise, the flow proceeds to the step 306.

Step 305: The virtual print parameters, the ID of the virtual print parameter template and the print content ID are sent to the determined idle print processing apparatus, and the flow ends.

Step 306: A print request sent from a next idle print processing apparatus is received, and the flow returns to the step 304.

As illustrated in FIG. 4 showing a print scheduling method of determining a print processing apparatus by a cluster of print processing apparatuses in an embodiment of the invention, the method includes the following steps.

Step 401: A print task sent from a print client is received, where the print task includes virtual print parameters, the ID of a virtual print parameter template, a print content ID and the ID of a cluster of print processing apparatuses corresponding to the print processing apparatus.

Step 402: It is determined whether the received print task includes a print split command, and if it includes a print split command, then the flow proceeds to the step 403; otherwise, the flow proceeds to the step 404.

Step 403: The print task is split into a plurality of print sub-tasks in response to the print split command determined by a user, and then the flow proceeds to the step 404.

Step 404: It is determined whether an idle print processing apparatus currently sending a print request is among the cluster of print processing apparatuses, and if it is among the cluster of print processing apparatuses, then the flow proceeds to the step 405; otherwise, the flow proceeds to the step 406.

Step 405: The virtual print parameters, the ID of the virtual print parameter template and the print content ID are sent to the determined idle print processing apparatus, and the flow ends.

Step 406: A print request sent from a next idle print processing apparatus is received, and the flow returns to the step 404.

As illustrated in FIG. 5 showing a print processing method in an embodiment of the invention, the method includes the following steps.

Step 501: A print request is sent in an idle status to a print scheduling apparatus.

Step 502: A print task notified of from the print scheduling apparatus in response to the print request is received, physical print parameters and print contents are determined from the received print task, and the physical print parameters and the print contents are sent to a corresponding printer for print processing.

Particularly in the step 501, the idle print processing apparatus sends the print request to the print scheduling apparatus, or the print processing apparatus in operation processes an ongoing job and then sends the print request to the print scheduling apparatus at the end of processing the job.

Particularly the print processing apparatus and the print scheduling apparatus in the embodiment of the invention can exist separately in a terminal, or both of them can coexist in a print server.

In the step 502, the physical print parameters and the print contents are determined from the received print task and the physical print parameters and the print contents are sent to the corresponding printer for print processing particularly as follows:

A virtual print parameter template corresponding to a received ID of the virtual print parameter template is determined, a physical print parameter template corresponding to the virtual print parameter template is determined according to a pre-created correspondence relationship between the virtual print parameter template and the physical print parameter template, and the physical print parameters included in the physical print parameter template are determined.

A print server can further include a print parameter configuration facility which generates a physical print parameter template of each print processing apparatus from physical print parameters of the print processing apparatus, attributes print processing apparatuses, to which a part or all of print characteristics are common, to a cluster of print processing apparatuses, and generates a virtual print parameter template of the cluster of print processing apparatuses from the print characteristics common to all the print processing apparatuses in the cluster of print processing apparatuses. Each print processing apparatus creates a correspondence relationship between the template ID of the physical print parameter template and the template ID of the virtual print parameter template corresponding to the print processing apparatus and a correspondence relationship between physical print parameters in the physical print parameter template of the print processing apparatus and virtual print parameters in the virtual print parameter template corresponding to the print processing apparatus.

Particularly the print parameter configuration facility can be stored in the print server as illustrated in the embodiment of the invention or can be stored in another storage medium and connected for use in generation of the physical print parameter template of the print processing apparatus and the corresponding virtual print parameter template as needed.

Upon reception of the ID of the virtual print parameter template, the print processing apparatus determines the physical print parameter template according to the correspondence relationship between the template ID of the physical print parameter template and the template ID of the virtual print parameter template and determines the physical print parameters in the physical print parameter template according to the correspondence relationship between the physical print parameters and the virtual print parameters in the corresponding virtual print parameter template.

As illustrated in FIG. 6 showing a schematic structural diagram of a physical print parameter template of a print processing apparatus, the physical print parameter template includes the ID of the template, the length in bytes of the name of a printer to which the template belongs, the name of the printer to which the template belongs, the length in bytes of print parameters and contents of the print parameters. Each print processing apparatus corresponds to a unique template ID of a physical print parameter template, and the ID of the template can be an identification string in a fixed length. The name of the printer to which the template belongs is a string of characters in a variable length, and the length in bytes of the name of the printer to which the template belongs is a field in a fixed length, typically one byte, which represents the length in bytes of the string of characters for the name of the printer to which the template belongs. The length in bytes of the print parameters represents the length in bytes of configuration information of the print parameters of the printer to which the physical print parameter template refers to, and this field is typically in two bytes. The contents of the print parameters are in a binary format, and different printers are typically provided with the same print characteristic parameters represented in different binary digits.

Preferably in the step 502, the print processing apparatus determines the physical print parameters and the print contents from the received notification and sends the physical print parameters and the print contents to the corresponding printer for print processing without sending any print request to the print scheduling apparatus, and the print processing apparatus further sends a print request to the print scheduling apparatus at the end of the ongoing print task.

Figure 7:
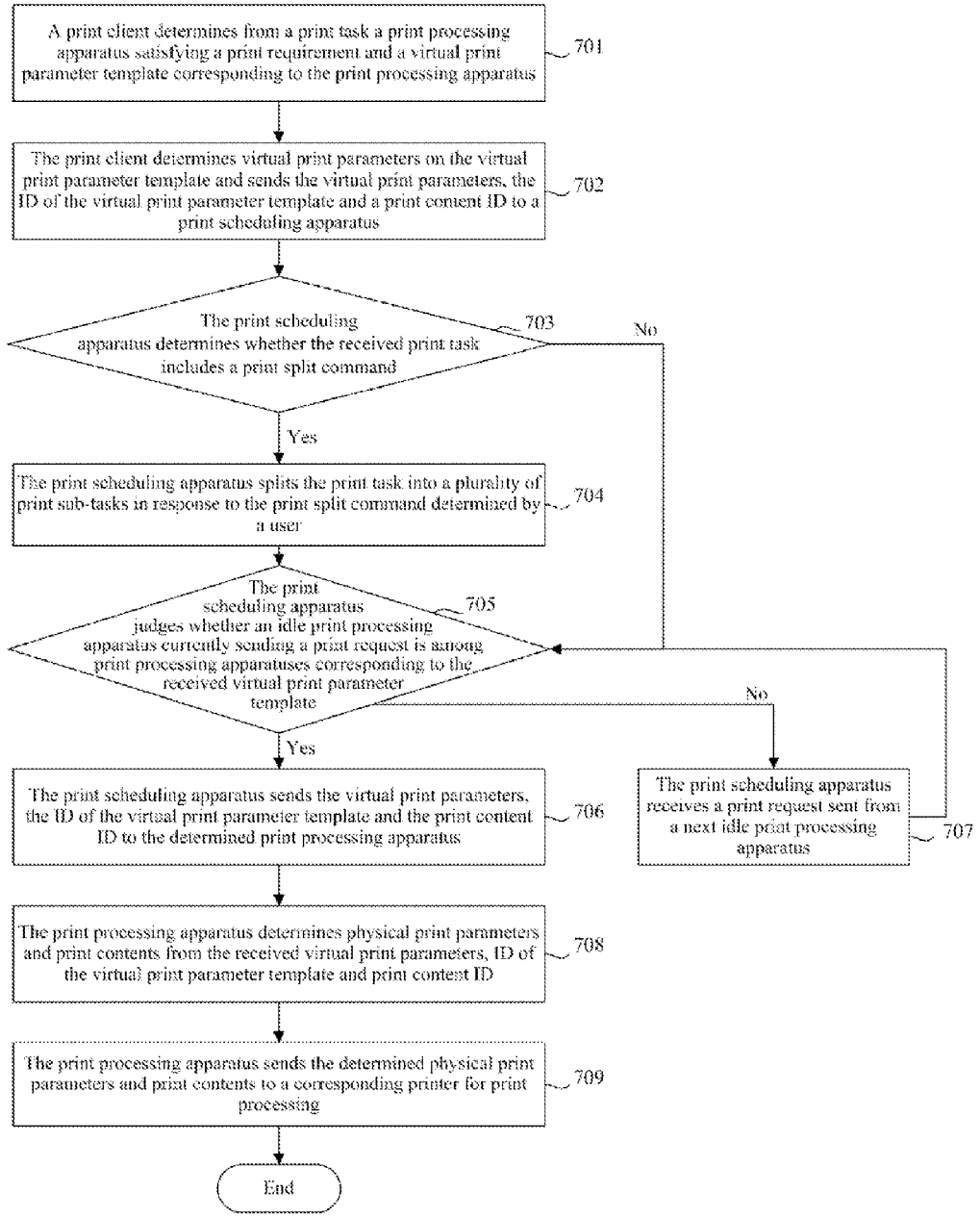
FIG. 7 is a schematic flow chart of a print method in which a print processing apparatus is determined by a virtual print parameter template in an embodiment of the invention.

As illustrated in FIG. 7 showing a print method in which a print processing apparatus is determined by a virtual print parameter template in an embodiment of the invention, the method includes the following steps.

Step 701: A print client determines from a print task a print processing apparatus satisfying a print requirement and a virtual print parameter template corresponding to the print processing apparatus.

Step 702: The print client determines virtual print parameters on the virtual print parameter template and sends the virtual print parameters, the ID of the virtual print parameter template and a print content ID to a print scheduling apparatus.

Step 703: The print scheduling apparatus determines whether the received print task includes a print split command, and if it includes a print split command, then the flow proceeds to the step 704; otherwise, the flow proceeds to step 705.

Step 704: The print scheduling apparatus splits the print task into a plurality of print sub-tasks in response to the print split command determined by a user, and the flow proceeds to the step 705.

Step 705: The print scheduling apparatus judges whether an idle print processing apparatus currently sending a print request is among print processing apparatuses corresponding to the received virtual print parameter template, and if it is among the print processing apparatuses corresponding to the virtual print parameter template, then the flow proceeds to the step 706; otherwise, the flow proceeds to the step 707.

Step 706: The print scheduling apparatus sends the virtual print parameters, the ID of the virtual print parameter template and the print content ID to the determined print processing apparatus.

Step 707: The print scheduling apparatus receives a print request sent from a next idle print processing apparatus, and the flow returns to the step 705.

Step 708: The print processing apparatus determines physical print parameters and print contents from the received virtual print parameters, ID of the virtual print parameter template and print content ID.

Step 709: The print processing apparatus sends the determined physical print parameters and print contents to a corresponding printer for print processing.

Figure 8:
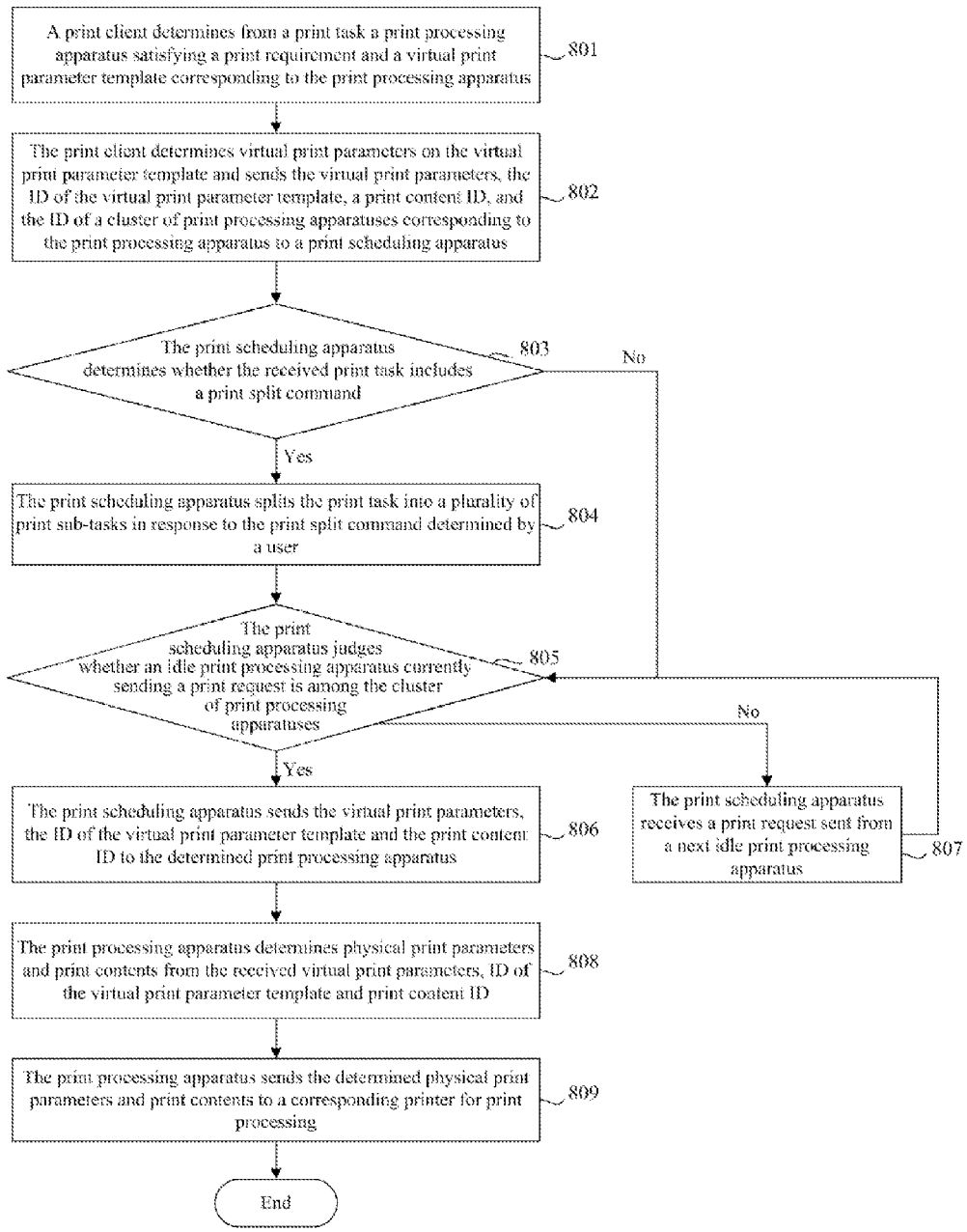
FIG. 8 is a schematic flow chart of a print method in which a print processing apparatus is determined by a cluster of print processing apparatuses in an embodiment of the invention.

As illustrated in FIG. 8 showing a print method in which a print processing apparatus is determined by a cluster of print processing apparatuses in an embodiment of the invention, the method includes the following steps.

Step 801: A print client determines from a print task a print processing apparatus satisfying a print requirement and a virtual print parameter template corresponding to the print processing apparatus.

Step 802: The print client determines virtual print parameters on the virtual print parameter template and sends the virtual print parameters, the ID of the virtual print parameter template, a print content ID, and the ID of a cluster of print processing apparatuses corresponding to the print processing apparatus to a print scheduling apparatus.

Step 803: The print scheduling apparatus determines whether the received print task includes a print split command, and if it includes a print split command, then the flow proceeds to the step 804; otherwise, the flow proceeds to the step 805.

Step 804: The print scheduling apparatus splits the print task into a plurality of print sub-tasks in response to the print split command determined by a user, and the flow proceeds to the step 805.

Step 805: The print scheduling apparatus judges whether an idle print processing apparatus currently sending a print request is among the cluster of print processing apparatuses, and if it is among the cluster of print processing apparatuses, then the flow proceeds to the step 806; otherwise, the flow proceeds to the step 807.

Step 806: The print scheduling apparatus sends the virtual print parameters, the ID of the virtual print parameter template and the print content ID to the determined print processing apparatus.

Step 807: The print scheduling apparatus receives a print request sent from a next idle print processing apparatus, and the flow returns to the step 805.

Step 808: The print processing apparatus determines physical print parameters and print contents from the received virtual print parameters, ID of the virtual print parameter template and print content ID.

Step 809: The print processing apparatus sends the determined physical print parameters and print contents to a corresponding printer for print processing.

Based upon the same inventive idea, an embodiment of the invention further provides a print apparatus, and since this apparatus addresses the problem under a similar principle to a print method according to the embodiment of the invention, reference can be made to the implementation of the method for an implementation of the apparatus, and a repeated description thereof will be omitted.

Figure 9:
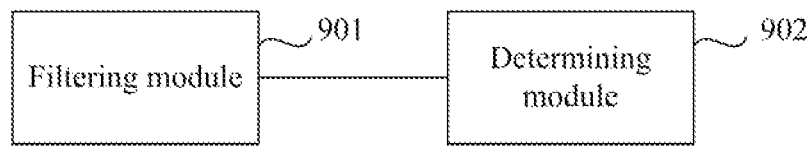
FIG. 9 is a schematic diagram of a print scheduling apparatus in an embodiment of the invention.

As illustrated in FIG. 9 showing a print scheduling apparatus in an embodiment of the invention, the apparatus includes a filtering module 901 and a determining module 902.

The filtering module 901 is configured to determine at least one print processing apparatus satisfying a print requirement of a user.

The determining module 902 is configured, upon reception of a print request sent from an idle print processing apparatus, to notify, the idle print processing apparatus sending the print request, of a print task of the user if it is determined that the idle print processing apparatus sending the print request is included among the at least one print processing apparatus satisfying the print requirement of the user.

The filtering module 901 is particularly configured to determine a virtual print parameter template selected by the user through a print client and to take a print processing apparatus corresponding to the determined virtual print parameter template as a print processing apparatus satisfying print parameters selected by the user.

Particularly each virtual print parameter template includes virtual print parameters representing print characteristics, each virtual print parameter template corresponds to at least one print processing apparatus, and the virtual print parameters in each virtual print parameter template represent print characteristics common to printers corresponding to all the print processing apparatuses corresponding to the virtual print parameter template.

Particularly the filtering module 901 determines the print processing apparatus corresponding to the virtual print parameter template in two approaches which will be described below respectively.

In a first approach, the filtering module 901 determines the print processing apparatus by the ID of the virtual print parameter template.

The filtering module 901 stores therein a correspondence relationship between each virtual print parameter template and an ID of a corresponding print processing apparatus, and determines the ID of the print processing apparatus corresponding to the virtual print parameter template upon reception of the ID of the virtual print parameter template corresponding to the virtual print parameter template selected by the user through the print client; and upon reception of a print request sent from an idle print processing apparatus, the filtering module 901 determines whether the ID of the idle print processing apparatus belongs to the print processing apparatus corresponding to the currently received virtual print parameter template, and if the ID belongs to the print processing apparatus corresponding to the virtual print parameter template, then the filtering module 901 sends the virtual print parameters, the ID of the virtual print parameter template and a print content ID to the idle print processing apparatus; otherwise, the filtering module 901 continues with receiving a print request sent from a next idle print processing apparatus and returns to the step of determining whether the idle print processing apparatus currently sending the print request to the print scheduling apparatus is among the print scheduling apparatuses corresponding to the virtual print parameter template.

In a second approach, the filtering module 901 determines the print processing apparatus by the ID of a cluster of print processing apparatuses.

A print server further includes a print parameter configuration facility which attributes print processing apparatuses, to which a part or all of print characteristics are common, to a cluster of print processing apparatuses and stores the ID of each print processing apparatus in the cluster of print processing apparatuses. The print parameter configuration facility generates a virtual print parameter template corresponding to the cluster of print processing apparatuses from the print characteristics common to all the print processing apparatuses in the cluster of print processing apparatuses.

The print client selects a print processing apparatus and a virtual print parameter template corresponding to the print processing apparatus, and selects virtual print parameters on the virtual print parameter template, and the print client determines a cluster of print processing apparatuses corresponding to the print processing apparatus according to a correspondence relationship between the virtual print parameter template and the cluster of print processing apparatuses; and the print client sends the virtual print parameters, the ID of the virtual print parameter template, a print content ID, and the ID of the cluster of print processing apparatuses corresponding to the print processing apparatus to the print scheduling apparatus.

The filtering module 901 determines the ID of the cluster of print processing apparatuses selected by the user through the print client and determines the print processing apparatuses corresponding to the determined cluster of print processing apparatuses as print processing apparatuses satisfying the print parameters selected by the user.

Particularly each cluster of print processing apparatuses stores therein the ID of each print processing apparatus in the cluster of print processing apparatuses, and each cluster of print processing apparatuses corresponds to at least one print processing apparatus.

The filtering module 901 determines from the ID of the cluster of print processing apparatuses the print processing apparatuses corresponding to the cluster of print processing apparatuses; and upon reception of a print request sent from an idle print processing apparatus, the filtering module 901 determines whether the idle print processing apparatus is among the determined cluster of print processing apparatuses, and if it is among the cluster of print processing apparatuses, then the filtering module 901 sends the virtual print parameters, the ID of the virtual print parameter template, the print content ID to the idle print processing apparatus; otherwise, the filtering module 901 continues with receiving a print request sent from a next idle print processing apparatus and returns to the step of determining whether the idle print processing apparatus currently sending the print request to the print scheduling apparatus is among the cluster of print scheduling apparatuses corresponding to the virtual print parameter template.

There may be several print tasks in the determining module 902, and when a print processing apparatus sends a print request to the print scheduling apparatus, the print scheduling apparatus determines whether the ID of a virtual print parameter template or the ID of a cluster of print processing apparatuses of a print task corresponds to the print processing apparatus, and if the ID corresponds to the ID of the print processing apparatus, then the print scheduling apparatus notifies the print processing apparatus of the ID of the virtual print parameter template and print contents corresponding to the task; otherwise, the print scheduling apparatus determines whether the print processing apparatus is of a print processing apparatus corresponding to the ID of a virtual print parameter template or the ID of a cluster of print processing apparatuses of another print task.

Preferably the determining module 902 is further configured to split the print task into a plurality of print sub-tasks upon determining that the user needs to split the print task. Particularly the user can choose to split the print task into a number of pages or can choose to split the print task into a number of copies.

Upon reception of the print request sent from the idle print processing apparatus, the determining module 902 sends, to the idle print processing apparatus sending the print request, the virtual print parameter template ID corresponding to the determined virtual print parameter template and a print sub-task which has not been sent to any print processing apparatus if it is determined that the idle print processing apparatus is among the at least one print processing apparatus satisfying the print requirement of the user.

Figure 10:
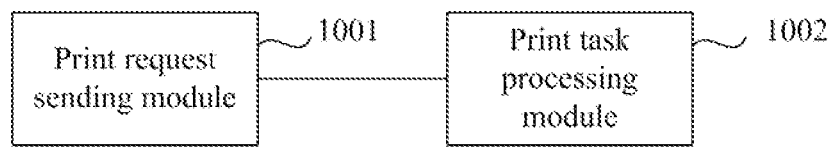
FIG. 10 is a schematic diagram of a print processing apparatus in an embodiment of the invention.

As illustrated in FIG. 10 showing a print processing apparatus in an embodiment of the invention, the apparatus includes a print request sending module 1001 and a print task processing module 1002.

The print request sending module 1001 is configured to send in an idle status a print request to a print scheduling apparatus.

The print task processing module 1002 is configured to receive a print task notified of from the print scheduling apparatus in response to the print request, to determine physical print parameters and print contents from the received print task, and to send the physical print parameters and the print contents to a corresponding printer for print processing.

Particularly the print task processing module 1002 is particularly configured to determine a virtual print parameter template corresponding to a received ID of the virtual print parameter template, to determine a physical print parameter template corresponding to the virtual print parameter template according to a pre-created correspondence relationship between the virtual print parameter template and the physical print parameter template, and to determine the physical print parameters included in the physical print parameter template.

A print parameter configuration facility is configured to generate a physical print parameter template of each print processing apparatus from physical print parameters of the print processing apparatus, to attribute print processing apparatuses, to which a part or all of print are common, to a cluster of print processing apparatuses, and to generate a virtual print parameter template of the cluster of print processing apparatuses from the print characteristics common to all the print processing apparatuses in the cluster of print processing apparatuses. Each print processing apparatus creates a correspondence relationship between the template ID of the physical print parameter template and the template ID of the virtual print parameter template corresponding to the print processing apparatus and a correspondence relationship between physical print parameters in the physical print parameter template of the print processing apparatus and virtual print parameters in the virtual print parameter template corresponding to the print processing apparatus.

Particularly the print parameter configuration facility can be stored in a print server as illustrated in the embodiment of the invention or can be stored in another storage medium and connected for use in generation of the physical print parameter template of the print processing apparatus and the corresponding virtual print parameter template as needed.

Upon reception of the ID of the virtual print parameter template, the print task processing module 1002 determines the physical print parameter template according to the correspondence relationship between the template ID of the physical print parameter template and the template ID of the virtual print parameter template and determines the physical print parameters in the physical print parameter template according to the correspondence relationship between the physical print parameters and the virtual print parameters in the corresponding virtual print parameter template.

The print task processing module 1002 is configured to determine the physical print parameters and the print contents from the received notification and to send the physical print parameters and the print contents to the corresponding printer for print processing without sending any print request to the print scheduling apparatus, and the print processing apparatus further sends a print request to the print scheduling apparatus at the end of the ongoing print task.

Figure 11:
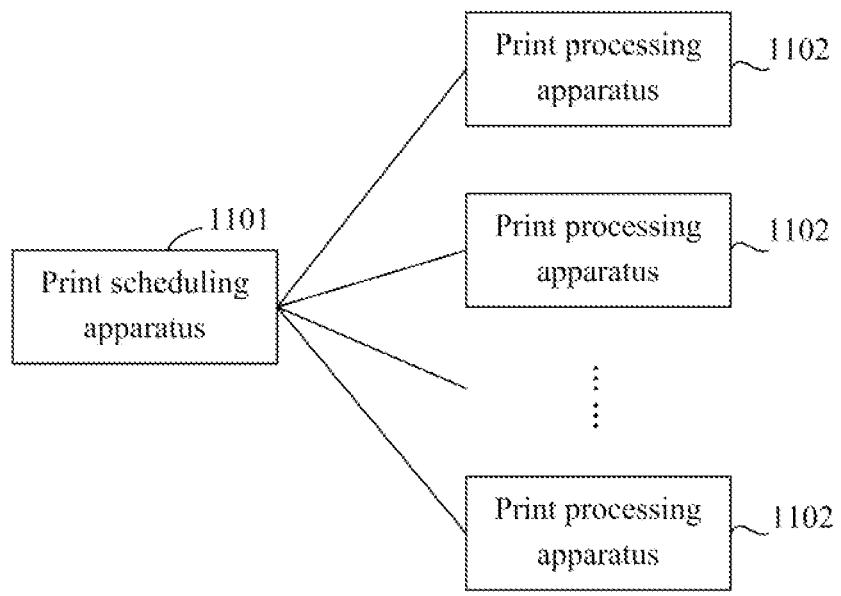
FIG. 11 is a schematic diagram of a print system in an embodiment of the invention.

As illustrated in FIG. 11 showing a print system in an embodiment of the invention, the system includes a print scheduling apparatus 1101 and a print processing apparatus 1102.

The print scheduling apparatus 1101 is configured to determine at least one print processing apparatus satisfying a print requirement of a user; and upon reception of a print request sent from an idle print processing apparatus, to notify, the idle print processing apparatus sending the print request, of a print task of the user if it is determined that the idle print processing apparatus sending the print request is included among the at least one print processing apparatus satisfying the print requirement of the user.

The print processing apparatus 1102 is configured to send in an idle status the print request to the print scheduling apparatus; and to receive the print task notified of from the print scheduling apparatus in response to the print request, to determine physical print parameters and print contents from the received print task, and to send the physical print parameters and the print contents to a corresponding printer for print processing.

Particularly the print scheduling apparatus 1101 and the print processing apparatus 1102 can be stored in the same print server or can be stored in different terminals.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A print scheduling method, comprising:
receiving, by a print scheduling apparatus, a print task from a user, and determining a cluster of print processing apparatuses satisfying the print task of the user, wherein the cluster comprises at least one print processing apparatus; and receiving, by the print scheduling apparatus, a print request sent from an idle print processing apparatus,
wherein the print request indicates that the idle print processing apparatus is currently in an idle status and able to perform print processing; determining, by the print scheduling apparatus, whether the idle print processing apparatus, which sends the print request, is included in the cluster satisfying the print task of the user, and if so, notifying the idle print processing apparatus of the print task of the user, so that the idle print processing apparatus determines a virtual print parameter template corresponding to a corresponding virtual print parameter template ID from the received print task,
determines a physical print parameter template corresponding to the virtual print parameter template according to a pre-created correspondence relationship between the virtual print parameter template and the physical print parameter template;
and determines the physical print parameters included in the physical print parameter template; wherein the physical print parameter template includes an ID of the template, a length in bytes of a name of a printer to which the template belongs, the name of the printer to which the template belongs, a length in bytes of print parameters and contents of the print parameters;
wherein the print task comprises a virtual print parameter template, then determining the cluster of print processing apparatuses satisfying the print task of the user comprises: receiving the virtual print parameter template selected by the user through a print client,
wherein each virtual print parameter template corresponds to a cluster of print processing apparatuses, each virtual print parameter template includes virtual print parameters representing print characteristics,
and the virtual print parameters in each virtual print parameter template represent print characteristics common to printers corresponding to all the print processing apparatuses in the cluster corresponding to the virtual print parameter template;
and taking a cluster of print processing apparatuses corresponding to the determined virtual print parameter template as the cluster of print processing apparatuses satisfying the print task of the user.

2. The method according to claim 1, wherein notifying the idle print processing apparatus of the print task of the user comprises: notifying the idle print processing apparatus of the ID of the virtual print parameter template corresponding to the determined virtual print parameter template and print contents.

3. The method according to claim 1, wherein before the idle print processing apparatus is notified of the print task of the user, the method further comprises: splitting the print task into a plurality of print sub-tasks upon determining that the print task needs to be split; and wherein notifying the idle print processing apparatus of the print task of the user comprises: notifying the idle print processing apparatus of the ID of the virtual print parameter template corresponding to the determined virtual print parameter template and a print subtask which has not been sent to any print processing apparatus.

4. A print processing method, comprising: sending, by a print processing apparatus in an idle status, a print request to a print scheduling apparatus, wherein the print request indicates that the print processing apparatus is currently in an idle status and able to perform print processing; and receiving, by the print processing apparatus, a print task notified of from the print scheduling apparatus in response to the print request, determining physical print parameters and print contents from the received print task,
- and sending the physical print parameters and the print contents to a corresponding printer for print processing; wherein determining the physical print parameters from the received print task comprises: determining, from the received print task,
- a virtual print parameter template corresponding to a corresponding virtual print parameter template ID, and determining the physical print parameters from the virtual print parameter template, the physical print parameters are in a binary format, wherein determining the physical print parameters from the virtual print parameter template comprises:
- determining a physical print parameter template corresponding to the virtual print parameter template according to a pre-created correspondence relationship between the virtual print parameter template and the physical print parameter template; and
- determining the physical print parameters included in the physical print parameter template;
- wherein the physical print parameter template includes the ID of the template, the length in bytes of the name of a printer to which the template belongs, the name of the printer to which the template belongs, the length in bytes of print parameters and contents of the print parameters.

5. A print scheduling apparatus, comprising: a processor configured to receive a print task from a user, and determine a cluster of print processing apparatuses satisfying the print task of the user, wherein the cluster comprises at least one print processing apparatus;
and to receive a print request sent from an idle print processing apparatus, wherein the print request indicates that the idle print processing apparatus is currently in an idle status and able to perform print processing;

the processor is further configured to determine whether the idle print processing apparatus, which sends the print request, is included in the cluster satisfying the print task of the user, and if so, to notify the idle print processing apparatus of the print task of the user, so that the idle print processing apparatus determines a virtual print parameter template corresponding to a corresponding virtual print parameter template ID from the received print task, determines a physical print parameter template corresponding to the virtual print parameter template according to a pre-created correspondence relationship between the virtual print parameter template and the physical print parameter template;

and determines the physical print parameters included in the physical print parameter template; wherein the physical print parameter template includes an ID of the template, a length in bytes of a name of a printer to which the template belongs, the name of the printer to which the template belongs, a length in bytes of print parameters and contents of the print parameters wherein the scheduler is particularly configured:
to receive a virtual print parameter template selected by the user through a print client, wherein each virtual print parameter template corresponds to a cluster of print processing apparatuses, each virtual print parameter template includes virtual print parameters representing print characteristics, and the virtual print parameters in each virtual print parameter template represent print characteristics common to printers corresponding to all the print processing apparatuses in the cluster corresponding to the virtual print parameter template; and to take a cluster of print processing apparatuses corresponding to the determined virtual print parameter template as the cluster of print processing apparatuses satisfying the print task of the user.

6. The apparatus according to claim 5, wherein the processor is configured: to notify the idle print processing apparatus of the ID of the virtual print parameter template corresponding to the determined virtual print parameter template and print contents.

7. The apparatus according to claim 5, wherein the processor is configured: to split the print task into a plurality of print sub-tasks upon determining that the print task needs to be split; and to notify the idle print processing apparatus of the ID of the virtual print parameter template corresponding to the determined virtual print parameter template and a print sub-task which has not been sent to any print processing apparatus.

* * * * *